(12) United States Patent
Held et al.

(10) Patent No.: US 7,536,862 B2
(45) Date of Patent: May 26, 2009

(54) FUEL NOZZLE FOR GAS TURBINE ENGINES

(75) Inventors: Timothy James Held, Blanchester, OH (US); James Neil Cooper, Hamilton, OH (US)

(73) Assignee: General Electric Company, Schenectady, NY (US)

(*) Notice: Subject to any disclaimer, the term of this patent is extended or adjusted under 35 U.S.C. 154(b) by 602 days.

(21) Appl. No.: 11/217,505

(22) Filed: Sep. 1, 2005

(65) Prior Publication Data

US 2007/0044477 A1   Mar. 1, 2007

(51) Int. Cl.
*F02C 1/00* (2006.01)
(52) U.S. Cl. .............................. 60/742; 60/740; 60/804
(58) Field of Classification Search .................. 60/734, 60/739, 742, 776, 740
See application file for complete search history.

(56) References Cited

U.S. PATENT DOCUMENTS

| | | | | |
|---|---|---|---|---|
| 3,777,983 A * | 12/1973 | Hibbins | ...................... | 239/422 |
| 5,101,633 A * | 4/1992 | Keller et al. | ................... | 60/737 |
| 6,393,823 B1 | 5/2002 | Badeer | | |
| 6,543,235 B1 * | 4/2003 | Black et al. | ................... | 60/776 |
| 6,935,117 B2 * | 8/2005 | Cowan | ........................ | 60/742 |
| 2004/0035114 A1 * | 2/2004 | Hayashi et al. | ............... | 60/736 |

* cited by examiner

*Primary Examiner*—Michael Cuff
*Assistant Examiner*—Phutthiwat Wongwian
(74) *Attorney, Agent, or Firm*—William Scott Andes, Esq.; Armstrong Teasdale LLP

(57) ABSTRACT

A gas turbine engine fuel nozzle includes an axis of symmetry extending therethrough, the nozzle body including a first passage extending coaxially therethrough, a second passage, and a third passage, the second passage circumscribing the first passage, the third passage formed radially outward of the second passage, and a nozzle tip coupled to the nozzle body, the nozzle tip including at least one primary discharge opening in flow communication with the first passage, at least one secondary discharge opening in flow communication with the second passage, and at least one tertiary discharge opening in flow communication with the third passage.

15 Claims, 5 Drawing Sheets

US 7,536,862 B2

FUEL NOZZLE FOR GAS TURBINE ENGINES

BACKGROUND OF THE INVENTION

This invention relates generally to gas turbine engines and, more particularly, to a fuel nozzle for a gas turbine engine.

Air pollution concerns worldwide have led to stricter emissions standards both domestically and internationally. Pollutant emissions from industrial gas turbines are subject to Environmental Protection Agency (EPA) standards that regulate the emission of oxides of nitrogen (NOx), unburned hydrocarbons (HC), and carbon monoxide (CO). In general, engine emissions fall into two classes: those formed because of high flame temperatures (NOx), and those formed because of low flame temperatures that do not allow the fuel-air reaction to proceed to completion (HC & CO).

Accordingly, at least one known industrial gas turbine application includes a steam injection system that is configured to inject steam into the combustor to facilitate reducing nitrous oxide emissions from the gas turbine engine. However, when the steam injection system is not in use, i.e. during dry operation, at least one known gas turbine engine utilizes at least one of an air or fuel purge to reduce the potential for cross-talk between adjacent fuel nozzles and/or to reduce backflow into the fuel nozzle caused by off-board steam system leakage. Cross-talk as used herein is defined as the inflow through a first fuel nozzle and outflow through a second fuel nozzle caused by a circumferential pressure distribution within the combustor. More specifically, at least one known gas turbine engine includes a relatively large steam circuit flow area, such that compressor discharge bleed air supply is insufficient to purge the fuel nozzles. Similarly, utilizing gas to purge the fuel nozzle results in a relatively small purge flow, which is insufficient to provide protection against the aforementioned situations.

BRIEF SUMMARY OF THE INVENTION

In one aspect, a method for delivering fuel in a gas turbine engine is provided. The method includes channeling fuel through the first passage such that fuel is discharged through the nozzle tip at least one primary discharge opening, channeling fuel through the second passage such that fuel is discharged through the nozzle tip at least one secondary discharge opening, and channeling steam through the third passage such that steam is discharged through the nozzle tip at least one tertiary discharge opening in a first operational mode.

In another aspect, a gas turbine engine fuel nozzle is provided. The gas turbine engine fuel nozzle includes an axis of symmetry extending therethrough, the nozzle body including a first passage extending coaxially therethrough, a second passage, and a third passage, the second passage circumscribing the first passage, the third passage formed radially outward of the second passage, and a nozzle tip coupled to the nozzle body, the nozzle tip including at least one primary discharge opening in flow communication with the first passage, at least one secondary discharge opening in flow communication with the second passage, and at least one tertiary discharge opening in flow communication with the third passage.

In a further aspect, a gas turbine engine assembly is provided. The gas turbine engine assembly includes a gas turbine engine, at least two manifolds coupled to the gas turbine engine, the at least two manifolds including a first manifold and a second manifold, the first manifold configured to deliver to the gas turbine engine a first gas, the second manifold configured to deliver to the gas turbine engine a first fuel; and at least one fuel nozzle. The fuel nozzle includes an axis of symmetry extending therethrough, the nozzle body including a first passage extending coaxially therethrough, a second passage, and a third passage, the second passage circumscribing the first passage, the third passage formed radially outward of the second passage, and a nozzle tip coupled to the nozzle body, the nozzle tip including at least one primary discharge opening in flow communication with the first passage, at least one secondary discharge opening in flow communication with the second passage, and at least one tertiary discharge opening in flow communication with the third passage.

DETAILED DESCRIPTION OF THE INVENTION

Figure 1:
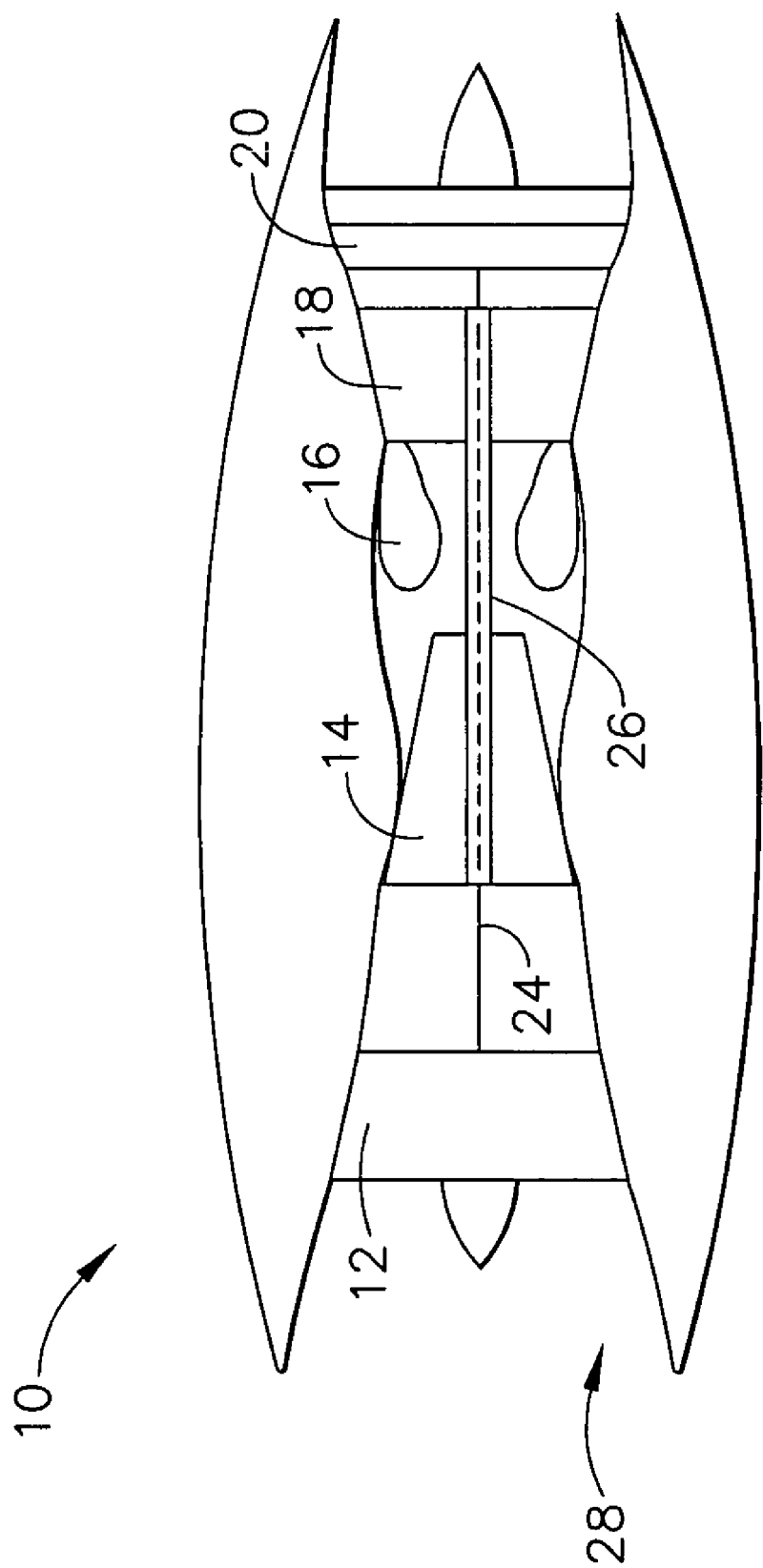
FIG. 1 is a schematic illustration of an exemplary gas turbine engine.

FIG. 1 is a schematic illustration of an exemplary gas turbine engine 10 including a low pressure compressor 12, a high pressure compressor 14, and a combustor 16. Engine 10 also includes a high pressure turbine 18, and a low pressure turbine 20 arranged in a serial, axial flow relationship. Compressor 12 and turbine 20 are coupled by a first shaft 24, and compressor 14 and turbine 18 are coupled by a second shaft 26. In one embodiment, gas turbine engine 10 is an LMS100 engine commercially available from General Electric Company, Cincinnati, Ohio.

In operation, air flows through low pressure compressor 12 from an upstream side 28 of engine 10. Compressed air is supplied from low pressure compressor 12 to high pressure compressor 14. Highly compressed air is then delivered to combustor assembly 16 where it is mixed with fuel and ignited. Combustion gases are channeled from combustor assembly 16 to drive turbines 18 and 20.

Figure 2:
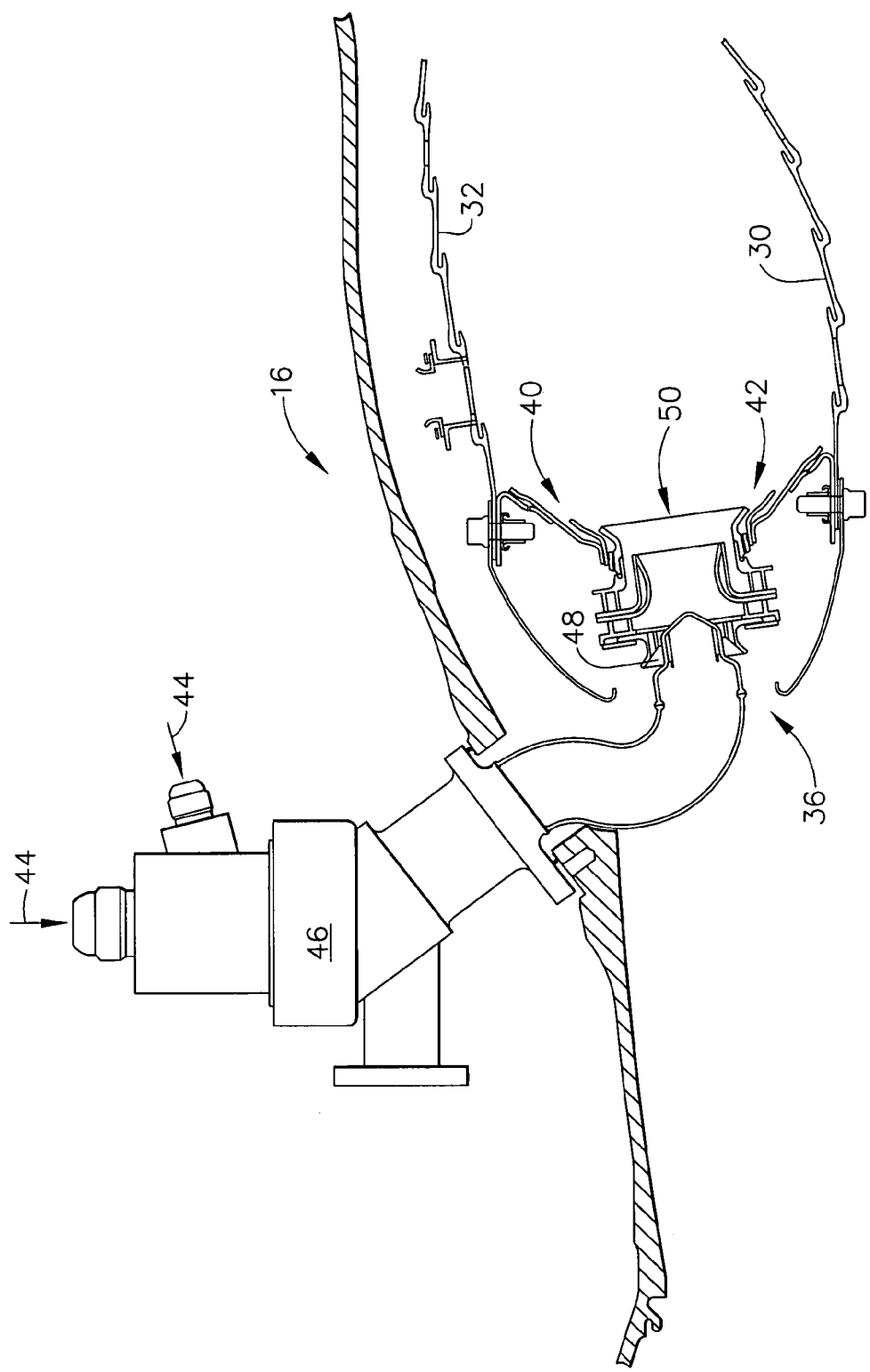
FIG. 2 is a cross-sectional view of an exemplary combustor used with the gas turbine engine shown in FIG. 1.

FIG. 2 is a cross-sectional view of a combustor, such as combustor 16, that may be used with gas turbine engine 10. Combustor 16 includes an inner liner 30 and an outer liner 32. Inner and outer liners 30 and 32 are joined at an upstream end 36 by a dome assembly 40. The cross section shown in FIG. 2 is taken through one of a plurality of swirler assemblies 42 that are mounted on dome assembly 40. A fuel line 44 delivers fuel to a fuel nozzle 46 that supplies fuel to an inlet 48 of swirler assembly 42. Fuel is mixed with air in swirler assembly 42 and the fuel/air mixture is introduced into combustor 16 from an outlet 50 of swirler assembly 42.

Figure 3:
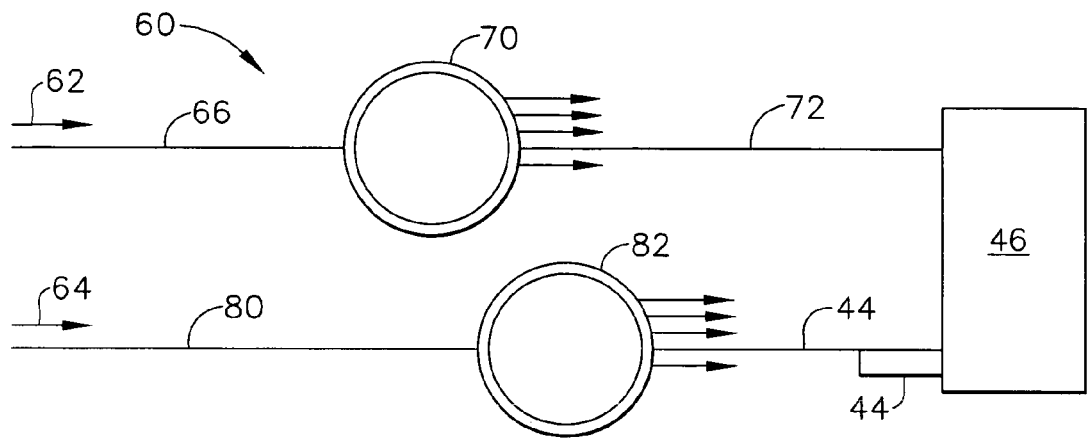
FIG. 3 is a schematic illustration of an exemplary fuel delivery system for the gas turbine engine shown in FIG. 1.

FIG. 3 is a schematic illustration of an exemplary fuel delivery system 60 that can be used with a gas turbine engine, such as gas turbine engine 10 (shown in FIG. 1). In the exemplary embodiment, fuel delivery system 60 includes a steam circuit 62 and a gas circuit 64 which respectively deliver a first gas, i.e. steam, and a first fuel, i.e. gas, to gas turbine engine 10. Steam circuit 62 and gas circuit 64 are both metered and sized to achieve a pressure ratio within fuel delivery system 60 appropriate for the gas being delivered to gas turbine engine 10. Steam circuit 62 delivers a metered steam flow to gas turbine engine 10 and gas circuit 64 delivers a metered first gas flow to gas turbine engine 10.

Steam circuit 62 includes a connecting line 66 which extends from a metering valve (not shown) to a first manifold 70. The metering valve is positioned between a steam supply source (not shown) and connecting line 66. In one embodiment, the first gas supply source is a steam supply source. First manifold 70 is connected to a connecting line 72 which extends from manifold 70 to a plurality of fuel nozzles, such as fuel nozzle 46, shown in FIG. 2. Fuel nozzles 46 are coupled to gas turbine engine 10 and deliver the secondary steam and secondary gas flows to gas turbine engine 10 once gas turbine engine 10 has been operating for a predetermined length of time and is being accelerated from the initial idle speed.

Gas circuit 64 includes a connecting line 80 which extends from a metering valve (not shown) to a second manifold 82. The metering valve is positioned between a gas supply source (not shown) and connecting line 80. In one embodiment, the gas supply source is a natural gas supply source. In an alternative embodiment, gas supply source is a liquid fuel source. Second manifold 82 is coupled to fuel line 44 which extends from manifold 82 to fuel nozzle 46. Fuel nozzles 46 are coupled to gas turbine engine 10 to deliver the first fuel to gas turbine engine 10 during initial operation of gas turbine engine 10 and while gas turbine engine 10 is operating during all operational conditions. In operation, fuel delivery system 60 is capable of delivering the steam and gas such that gas turbine engine 10 is capable of operating during all operational conditions.

Figure 5:
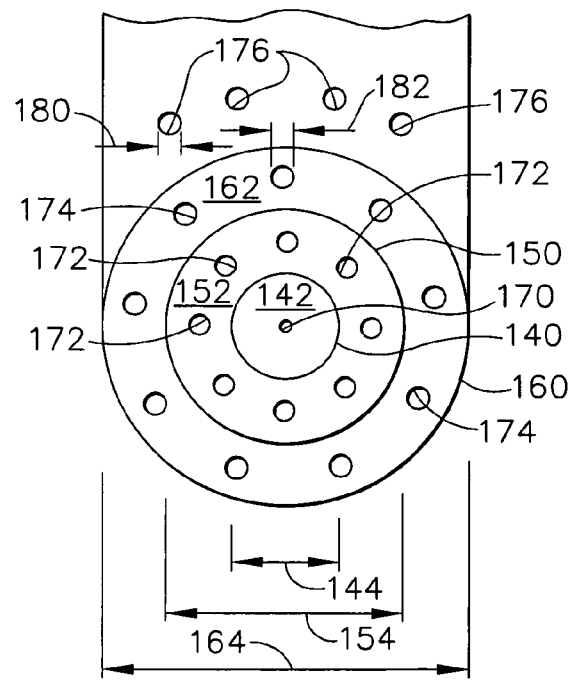
FIG. 5 is an end view of a portion of the fuel nozzle shown in FIG. 4.
Figure 4:
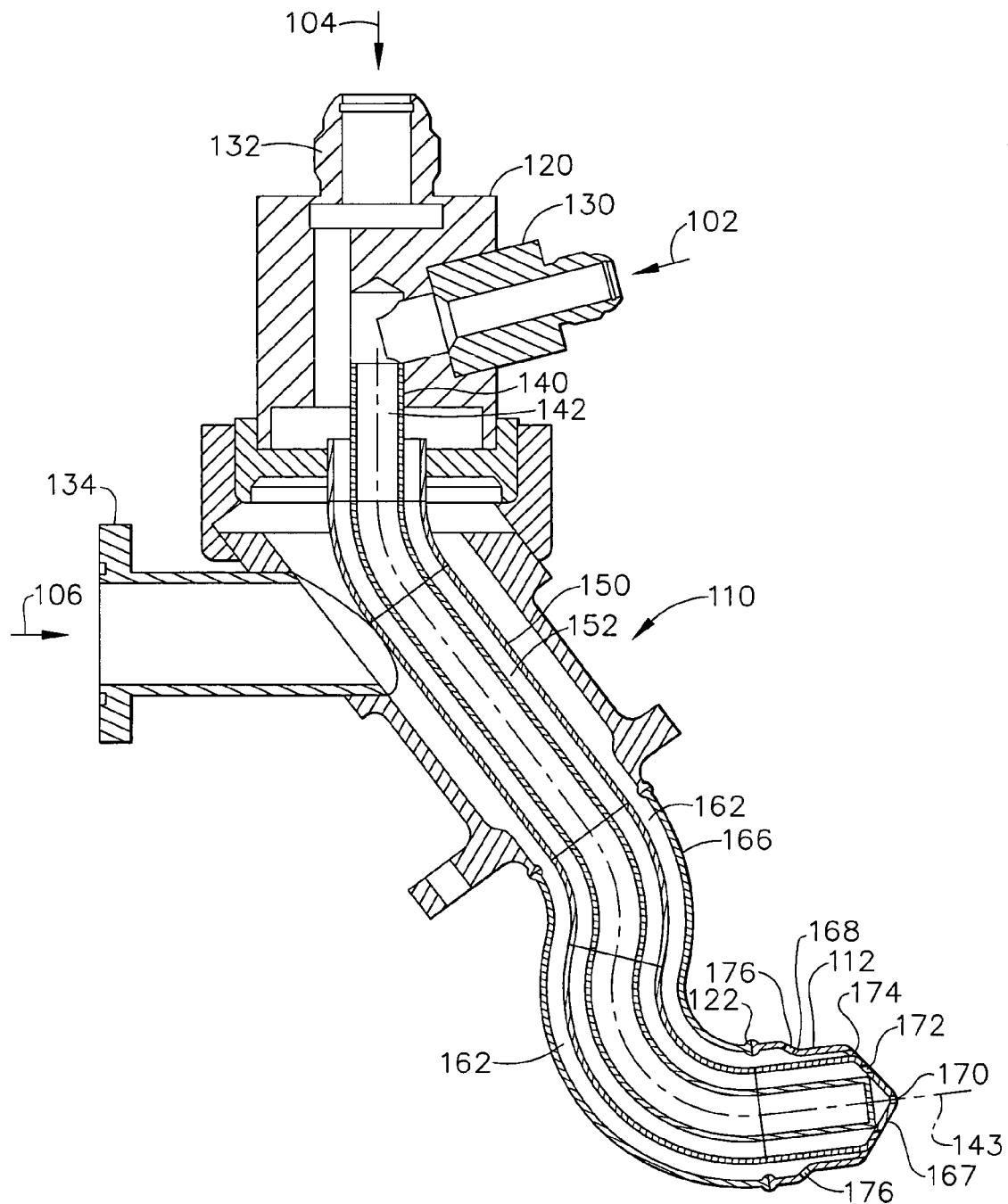
FIG. 4 is a cross-sectional view of an exemplary fuel nozzle that can be used with the gas turbine engine shown in FIG. 1.

FIG. 4 is a cross-sectional view of an exemplary fuel nozzle 100 that can be used with gas turbine engine 10 and system 60 (shown in FIG. 3). FIG. 5 is an end view of a portion of fuel nozzle 100 (shown in FIG. 4). Nozzle 100 includes a first fuel inlet 102, a second fuel inlet 104, and a steam inlet 106. In the exemplary embodiment, first and second fuel inlets 102 and 104 are coupled to gas circuit 64, and steam inlet 106 is coupled to steam circuit 62. Fuel nozzle 100 also includes a nozzle body 110, and a nozzle tip 112. Nozzle body 110 has a first end 120 and a second end 122. First fuel inlet 102, second fuel inlet 104, and steam inlet 106 are each positioned adjacent first end 120 and nozzle tip 112 is positioned adjacent second end 122.

In the exemplary embodiment, first fuel inlet 102 extends from nozzle body 110 and includes a coupling 130, and second fuel inlet 104 extends from nozzle body 110 and includes a coupling 132 which permits each of first and second fuel inlets 102 and 104 to be coupled to fuel line 44 (shown in FIGS. 2 and 3). Additionally, steam inlet 106 includes a coupling 134 which permits steam inlet 106 to be coupled to steam 72 (shown in FIG. 3).

More specifically, nozzle body 110 includes a first wall 140 that defines a first passage 142 that is positioned approximately along a centerline axis 143 of nozzle body 110. In the exemplary embodiment, first passage 142 extends from coupling 130 to nozzle tip 112 and is configured to channel fuel from coupling 130 to nozzle tip 112. Nozzle body 110 also includes a second wall 150. In the exemplary embodiment, second wall 150 is coupled radially outwardly from first wall 140, and substantially circumscribes first wall 140 such that a second passage 152 is defined between first wall 140 and second wall 150. Accordingly, second passage 152 has a diameter 154 that is greater than a diameter 144 of first passage 142. Nozzle body 110 also includes a third wall 160. In the exemplary embodiment, third wall 160 is coupled radially outwardly from second wall 150, and substantially circumscribes second wall 150 such that a third passage 162 is defined between second wall 150 and third wall 160. Accordingly, third passage 162 has a diameter 164 that is greater than second passage diameter 154. In the exemplary embodiment, third wall 160 forms an exterior surface 166 of nozzle body 110.

In the exemplary embodiment, nozzle tip 112, an end portion 167 and a body portion 168 that is coupled to and substantially circumscribes end portion 167 such that nozzle tip 112 has a substantially cylindrical cross-sectional profile. In the exemplary embodiment, nozzle tip 112 includes at least one first opening 170 that is formed through end portion 167 and is positioned along centerline axis 143. More specifically, first opening 170 is configured to discharge fuel that is channeled through first passage 142, through nozzle tip end portion 167, and into combustor 16. Nozzle tip 112 also includes a second plurality of openings 172 that are formed through nozzle tip end portion 167, and are positioned radially outwardly from first opening 170. In the exemplary embodiment, second plurality of openings 172 are configured to discharge fuel that is channeled through second passage 152, through nozzle tip end portion 167, and into combustor 16. Nozzle tip 112 also includes a third plurality of openings 174 that are formed through nozzle tip end portion 167, and are positioned radially outwardly from second plurality of openings 172. In the exemplary embodiment, third plurality of openings 174 are configured to discharge steam that is channeled through third passage 162, through nozzle tip end portion 167, and into combustor 16. In the exemplary embodiment, first, second, and third plurality of openings 170, 172, and 174 are each configured to discharge either fuel or steam, respectively, through nozzle tip 112 in a flow path that is substantially parallel with centerline axis 143.

Nozzle tip 112 also includes a fourth plurality of openings 176 that are formed through nozzle tip body portion 168, and are positioned upstream from third plurality of openings 174. In the exemplary embodiment, fourth plurality of openings 176 are configured to discharge steam that is channeled through third passage 162, through fourth plurality of openings 176, and into combustor 16. In the exemplary embodiment, fourth plurality of openings 176 are configured to discharge steam through nozzle tip body portion 168 in a flow path that is positioned at a predefined angle with respect to centerline axis 143. Moreover, and in the exemplary embodiment, fourth plurality of openings 176 a diameter 180 that is less than a diameter 182 of third plurality of openings 174 that during operation a first quantity of steam is channeled through fourth plurality of openings 176 that is less than a second quantity of steam that is channeled through third plurality of openings 174.

Figure 6:
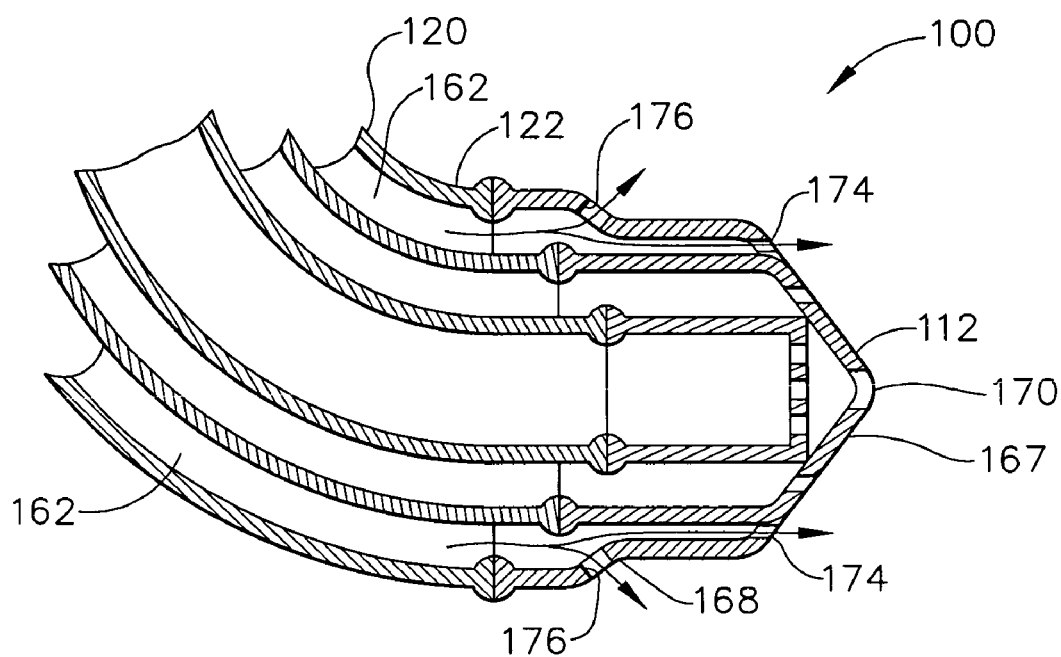
FIG. 6 is a cross-sectional view of the fuel nozzle shown in FIG. 4 during a first operational mode.
Figure 7:
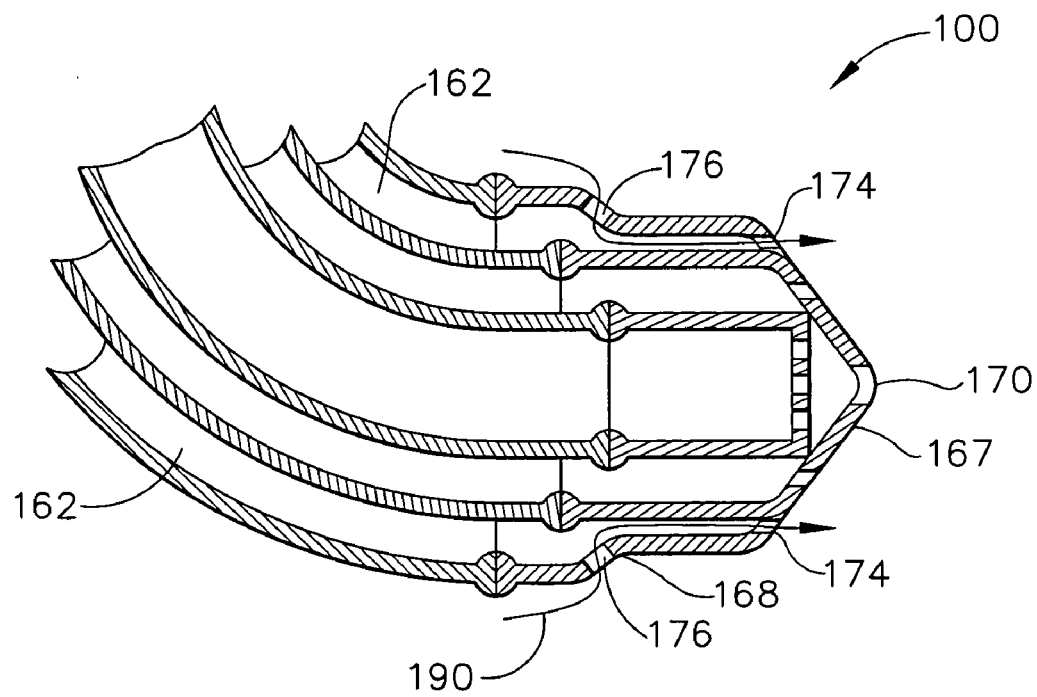
FIG. 7 is a cross-sectional view of the fuel nozzle shown in FIG. 4 during a second operational mode.

FIG. 6 is an enlarged cross-sectional view of fuel nozzle 100 (shown in FIG. 4) during a first operational mode. FIG. 7 is an enlarged cross-sectional view of fuel nozzle 100 (shown in FIG. 4) during a second operational mode. During operation, gas turbine 10, and thus fuel nozzle 46 can be operated in either a first mode or a second mode. In the exemplary embodiment, the first mode is referred to herein as an active mode, i.e. steam is channeled through fuel nozzle 100 and into combustor 16. Whereas, during the second mode, referred to herein as the inactive or dry mode, steam is not channeled through fuel nozzle 100 and into combustor 16.

Accordingly, when nozzle 100 is operated in the active mode (shown in FIG. 6), steam is channeled from steam circuit 62 to nozzle 100 via coupling 134. More specifically, steam is channeled from steam circuit 62 into third passage 162. The steam is then channeled from nozzle body first end 120 to nozzle body second end 122, and thus nozzle tip 112. In the exemplary embodiment, during the active mode, steam is channeled through openings 174 and openings 176 in combustor 16. More specifically, a first quantity of steam is channeled through openings 174 and a second quantity of steam, that is less than the first quantity of steam, is channeled through openings 176. For example, since openings 174 have a larger diameter than openings 176 a majority of the steam is channeled through openings 174 in the active mode. Accordingly, channeling steam through openings 174 and 176 during the active mode facilitates increasing the fuel efficiency of gas turbine engine 10.

Alternatively, when nozzle 100 is operated in the dry mode, steam is not channeled through nozzle 100. More specifically, when nozzle 100 is operated in the dry mode, the air pressure drop across swirler 42 generates a pressure differential between openings 174 and openings 176 such that an airflow 190 is forced through openings 176 into third passage 162 and then through openings 174. Thus, during the inactive mode, openings 176 facilitate purging fuel nozzle 100. More specifically, during dry operation, the air pressure drop across swirler 42 facilitates providing the driving pressure for a purge flow across nozzle tip 112. Moreover, through appropriate selection of the design variables, protection against circumferential pressure gradients and steam system leaks will be maintained without significantly impacting gas/steam emissions performance.

The above described fuel nozzle for a gas turbine engine is cost-effective and reliable. The fuel nozzle includes a separate steam injection circuit that is positioned on the outermost annulus of the fuel nozzle. Moreover, the nozzle stem forms the outer boundary of the steam circuit. Specifically, the above described fuel nozzle includes a series of orifices formed through the nozzle stem immediately upstream of the swirler/nozzle interface such that during active operation a fraction of the steam exits these "upstream holes," while the remainder is injected at the tip. Whereas, during dry operation, the air pressure drop across the swirler provide the driving pressure for a purge flow across the nozzle tip. Through appropriate selection of the design variables, protection against circumferential pressure gradients and steam system leaks will be maintained without significantly impacting gas/steam emissions performance.

While the invention has been described in terms of various specific embodiments, those skilled in the art will recognize that the invention can be practiced with modification within the spirit and scope of the claims.

What is claimed is:

1. A method for delivering fuel in a gas turbine engine including at least one fuel nozzle including a nozzle body having an axis of symmetry extending therethrough, the nozzle body comprising a first passage extending coaxially therethrough, a second passage, and a third passage, the second passage circumscribing the first passage, the third passage formed radially outward of the second passage, the third passage substantially circumscribing the second passage, and a nozzle tip coupled to the nozzle body, the nozzle tip comprising at least one primary discharge opening in flow communication with the first passage, at least one secondary discharge opening in flow communication with the second passage, and at least one tertiary discharge opening in flow communication with the third passage, said method comprising:

channeling fuel through the first passage such that fuel is discharged through the nozzle tip at least one primary discharge opening;

channeling fuel through the second passage such that fuel is discharged through the nozzle tip at least one secondary discharge opening;

channeling steam through the third passage such that steam is discharged through the nozzle tip at least one tertiary discharge opening in a first operational mode; and channeling cooling air through a plurality of fourth discharge openings and into the third passage such that the cooling air is discharged through the at least one tertiary discharge opening during a second operational mode wherein the plurality of fourth discharge openings is in flow communication with the third passage, the plurality of fourth discharge openings formed upstream from the at least one tertiary discharge opening.

2. A method in accordance with claim 1 wherein the nozzle tip further includes a plurality of fourth discharge openings in flow communication with the third passage, the plurality of fourth discharge openings formed upstream from the at least one tertiary discharge opening, said method further comprising channeling steam through the third passage such that steam is discharged through the nozzle tip plurality of fourth discharge openings in the first operational mode.

3. A method in accordance with claim 2 further comprising:

channeling a first volume of steam through the at least one tertiary discharge opening; and channeling a second volume of steam through the plurality of fourth discharge openings in the first operational mode.

4. A method in accordance with claim 2 further comprising:

channeling a first volume of steam through the at least one tertiary discharge opening; and channeling a second volume of steam through the plurality of fourth discharge openings in the first operational mode, wherein the first volume of steam is larger than the second volume of steam.

5. A method in accordance with claim 1 wherein the gas turbine engine further includes at least a first manifold and a second manifold, said method further comprising:

channeling steam through the first manifold to the fuel nozzle third passage; and channeling fuel through the second manifold to the first and second passages.

6. A fuel nozzle for a gas turbine engine, said fuel nozzle comprising:

a nozzle body having an axis of symmetry extending therethrough, said nozzle body comprising a first passage extending coaxially therethrough, a second passage, and a third passage, said second passage circumscribing said first passage, said third passage formed radially outward of said second passage, said third passage substantially circumscribing said second passage; and a nozzle tip coupled to said nozzle body, said nozzle tip comprising at least one primary discharge opening in flow communication with said first passage, at least one secondary discharge opening in flow communication with said second passage, at least one tertiary discharge opening in flow communication with said third passage, and a plurality of fourth discharge openings in flow communication with said third passage, said plurality of fourth discharge openings formed upstream from said at least one tertiary discharge opening wherein said third passage is configured to channel steam downstream through said nozzle tip tertiary discharge opening and said nozzle tip plurality of fourth discharge openings.

7. A fuel nozzle in accordance with claim 6 wherein said plurality of fourth discharge openings are configured to channel cooling air into said nozzle tip for purging said fuel nozzle through said at least one tertiary discharge opening.

8. A fuel nozzle in accordance with claim 6 wherein said first and second passages are configured to discharge fuel downstream through said nozzle tip at least one primary and secondary discharge openings.

9. A fuel nozzle in accordance with claim 6 wherein said third passage is configured to channel a first volume of steam through said at least one tertiary discharge opening and a second volume of steam through said plurality of fourth discharge openings.

10. A fuel nozzle in accordance with claim 6 wherein said third passage is configured to channel a first volume of steam through said at least one tertiary discharge opening, and a second volume of steam though said plurality of fourth discharge openings, said first volume of steam larger than said second volume of steam.

11. A gas turbine engine assembly comprising:
a gas turbine engine;
at least two manifolds coupled to said gas turbine engine, said at least two manifolds comprising a first manifold and a second manifold, said first manifold configured to deliver to the gas turbine engine a first gas, said second manifold configured to deliver to the gas turbine engine a first fuel; and
a fuel nozzle coupled to said manifolds, said fuel nozzle comprising:
a nozzle body having an axis of symmetry extending therethrough, said nozzle body comprising a first passage extending coaxially therethrough, a second passage, and a third passage, said second passage circumscribing said first passage, said third passage formed radially outward of said second passage, said third passage substantially circumscribing said second passage; and
a nozzle tip coupled to said nozzle body, said nozzle tip comprising at least one primary discharge opening in flow communication with said first passage, at least one secondary discharge opening in flow communication with said second passage, at least one tertiary discharge opening in flow communication with said third passage, and a plurality of fourth discharge openings in flow communication with said third passage, said plurality of fourth discharge openings formed upstream from said at least one tertiary discharge openings said first manifold channels steam through said third passage downstream through said nozzle tip at least one tertiary discharge opening and said nozzle tip plurality of fourth discharge openings.

12. A gas turbine engine assembly in accordance with claim 11 wherein said plurality of fourth discharge openings are configured to channel cooling air into said nozzle tip for purging said fuel nozzle through said at least one tertiary discharge opening.

13. A gas turbine engine assembly in accordance with claim 11 wherein said second manifold channels fuel through said first and second passages downstream through said nozzle tip primary and secondary discharge openings.

14. A gas turbine engine assembly in accordance with claim 11 wherein said third passage channels a first volume of steam downstream through said nozzle tip at least one tertiary opening and a second volume of steam through said nozzle tip plurality of fourth discharge openings.

15. A gas turbine engine assembly in accordance with claim 11 wherein said third passage channels a first volume of steam downstream through said nozzle tip at least one tertiary discharge opening and a second volume of steam through said nozzle tip plurality of fourth discharge openings, wherein said first volume of steam is larger than said second volume of steam.

* * * * *